United States Patent [19]
Mano

[11] Patent Number: 5,474,219
[45] Date of Patent: Dec. 12, 1995

[54] APPARATUS FOR AND METHOD OF STRIPPING PAPERBOARD

[75] Inventor: Hajime Mano, Nagoya, Japan

[73] Assignees: Kyoeki Kogyo Kabushiki Kaisha; Kawahara Shiki Kabushiki Kaisha; Kabushiki Kaisha Technotrans, all of, Japan

[21] Appl. No.: 194,047

[22] Filed: Feb. 9, 1994

[30] Foreign Application Priority Data

Feb. 15, 1993 [JP] Japan ................................. 5-050092

[51] Int. Cl.⁶ .................................................. B26F 1/40
[52] U.S. Cl. ................................ 225/2; 225/96; 225/104; 493/373
[58] Field of Search .......................... 83/27, 103, 619; 225/96, 97, 104, 103, 2; 493/82, 342, 83, 373

[56] References Cited

U.S. PATENT DOCUMENTS

| | | | |
|---|---|---|---|
| 2,110,998 | 3/1938 | McDaniels | 83/103 |
| 2,732,015 | 1/1956 | Whistler et al. | 83/619 |
| 3,055,275 | 9/1962 | Schroter | 225/97 |
| 3,089,376 | 5/1963 | Whistler et al. | 83/619 |
| 3,125,917 | 3/1964 | Smeets | 83/140 |
| 3,709,273 | 1/1973 | Jaccard et al. | |
| 3,782,166 | 1/1974 | Whistler, Jr. et al. | 83/619 |
| 3,784,070 | 1/1974 | Vossen | 493/342 |
| 3,786,731 | 1/1974 | Bobst et al. | 493/373 |
| 3,964,655 | 6/1976 | Kotaro | 493/373 |
| 4,452,595 | 6/1984 | Huff | 493/83 |
| 4,688,459 | 8/1987 | Osborn et al. | |
| 4,742,746 | 5/1988 | Olsson | 83/140 |
| 5,087,236 | 2/1992 | Morimoto | 493/342 |
| 5,178,051 | 1/1993 | Smith et al. | |

FOREIGN PATENT DOCUMENTS

| | | |
|---|---|---|
| 0453982A1 | 10/1991 | European Pat. Off. . |
| 483169 | 6/1986 | United Kingdom . |

OTHER PUBLICATIONS

European Search Report for European Application EP 94 25 0029, Applicant Kyoeki Kogyo Kabushiki Kaisha.

*Primary Examiner*—Kenneth E. Peterson
*Attorney, Agent, or Firm*—Palmatier, Sjoquist & Helget

[57] ABSTRACT

A stripping apparatus includes a pair of first and second base plates which are disposed in facing relationship to each other in a vertical direction and movable toward and away from each other. The first and second base plates include first support holes and second support holes, respectively, disposed in alignment with each other in the vertical direction. A plurality of pressing pins are insertable into the first and second support holes. A fixing device is provided on each of the first and second base plates for releasably fixing the pressing pins inserted into the first and second support holes. A blank and a waste of a paperboard are separated through abutment of the pressing pins fixed within the first support holes of the first base plate in the area corresponding to the blank and through abutment of the pressing pins fixed within the second support holes of the second base plate in the area corresponding to the waste when the first and second base plates are move toward each other with the paperboard interposed therebetween.

6 Claims, 8 Drawing Sheets

APPARATUS FOR AND METHOD OF STRIPPING PAPERBOARD

BACKGROUND OF THE INVENTION

1. Field of the Invention

The present invention relates to a stripping apparatus for a paperboard and a method of stripping the same, and more particularly to an apparatus for and a method of stripping a paperboard having a blank and a waste punched therein.

2. Description of the Prior Art

In order to fabricate a box from a paperboard, the paperboard is firstly cut in a predetermined pattern to provide a developed form of the box to be obtained. Such a cutting operation is performed with a plural number of paperboards superposed and the paperboards are cut while remaining joint portions between a blank and a waste of each of the paperboards at appropriate positions so as to prevent separation at this stage. The wastes are thereafter separated from the blanks.

Such separation of the wastes from the blanks are normally manually performed by an operator. In case of mass production, a stripping apparatus is used for separation and includes a pair of upper and lower dies and a press machine on which the dies are mounted.

However, in case of manual separation, the operator is required to sever the joint portions by means of a hammer or like tools. Therefore, such a manual separation involves the problem that the operation is very fatiguing for the operator and that the operation cannot be efficiently performed.

On the other hand, in case of separation by the stripping apparatus having the upper and lower dies, it involves the problem that much costs are required for manufacturing the dies and that the dies must be replaced by new ones whenever the cutting pattern of the paperboards is changed.

SUMMARY OF THE INVENTION

It is, accordingly, an object of the present invention to provide an apparatus for and a method of stripping a paperboard which permit to effectively separate a blank and a waste punched in the paperboard without manual operation by an operator and which can easily cope with changes of cutting pattern of the paperboard.

It is another object of the present invention to provide an apparatus for and a method of stripping a paperboard which can easily cope with multi-kind small-production the products as well as small-kind mass-production of the same.

According to the first aspect of the present invention, there is provided a stripping apparatus for separating a blank and a waste punched in the paperboard, comprising:

pair of first and second base plates disposed in facing relationship to each other in a vertical direction and movable toward and away from each other, the first and second base plates including first support holes and second support holes, respectively, disposed in alignment with each other in the vertical direction;

a plurality of pressing pins insertable into the first and second support holes; and fixing means provided on each of the first and second base plates for releasably fixing the pressing pins inserted into the first and second support holes, so that at least a part of each pressing pin extends outwardly from one of the first and second base plates toward the other of the first and second base plates facing thereto;

whereby the blank and the waste of the paperboard are separated through abutment of the pressing pins fixed within the first support holes of the first base plate in the area corresponding to the blank and through abutment of the pressing pins fixed within the second support holes of the second base plate in the area corresponding to the waste when the first and second base plates are move toward each other with the paperboard interposed therebetween.

According to the second aspect of the present invention, there is provided a method of stripping a paperboard having a blank and a waste punched therein, comprising the steps of:

a) positioning a pair of first and second base plates in facing relationship to each other in a vertical direction, each of the first and second base plates having a plurality of vertical support holes disposed in alignment with the other ones;

b) inserting first pressing pins into the support holes of said first base plate disposed in the area corresponding to the blank and fixing the first pressing pins in position in such a state that at least a part of each of the first pressing pins extends outwardly from the first base plate toward the second base plate;

c) inserting second pressing pins into the support holes of the second base plate disposed in the area corresponding to the waste and fixing the second pressing pins in position in such a state that at least a part of each of the second pressing pins extends outwardly from the second base plate toward the first base plate;

d) positioning the paperboard to be separated at a position between the first and second base plates; and e) moving the first and second base plates toward each other, so that the blank and the waste are separated from each other through abutment of the pressing pins of the first base plate on the blank and through abutment of the pressing pins of the second base plate on the waste.

The invention will become more fully apparent from the claims and the description as it proceeds in connection with the drawings.

DETAILED DESCRIPTION OF THE PREFERRED EMBODIMENT

Figure 1:
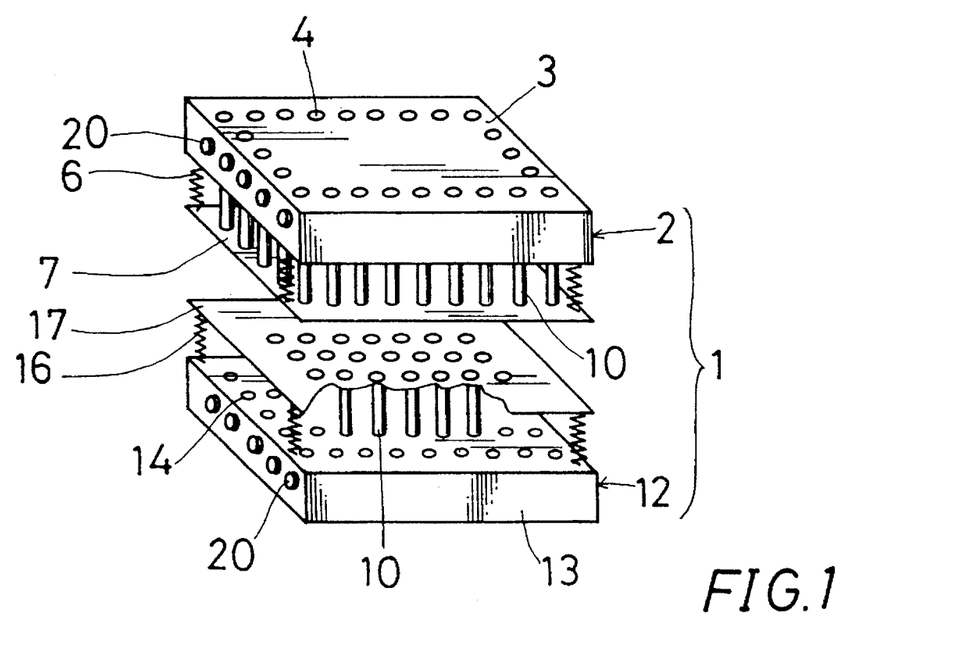
FIG. 1 is a perspective view of a stripping apparatus according to a first embodiment of the present invention.

Referring to FIG. 1, there is shown a general construction of a stripping apparatus 1 according to a first embodiment of the present invention.

The stripping apparatus 1 includes a pair of upper and lower pin boards 2 and 12. The pin boards 2 and 12 include base plates 3 and 13, respectively. The base plates 3 and 13 have a plurality of support holes 4 and 14, respectively, into which a plurality of pressing pins 10 are insertable. The pin boards 2 and 12 further include support plates 7 and 17 vertically movable toward and away from their corresponding base plates 3 and 13, respectively. The base plate 13 of the lower pin board 12 is secured to a fixed base (not shown). The base plate 3 of the upper pin board 2 is mounted on a press machine (not shown).

Each of the base plates 3 and 13 is made of a metal plate having a predetermined thickness and has a rectangular configuration of a predetermined size. The support holes 4 and 14 extend vertically through the base plates 3 and 13, respectively. The support holes 14 as well as the support holes 4 are arranged in rows in both longitudinal and transverse directions and are equally spaced from each other by a predetermined distance.

Figure 2:
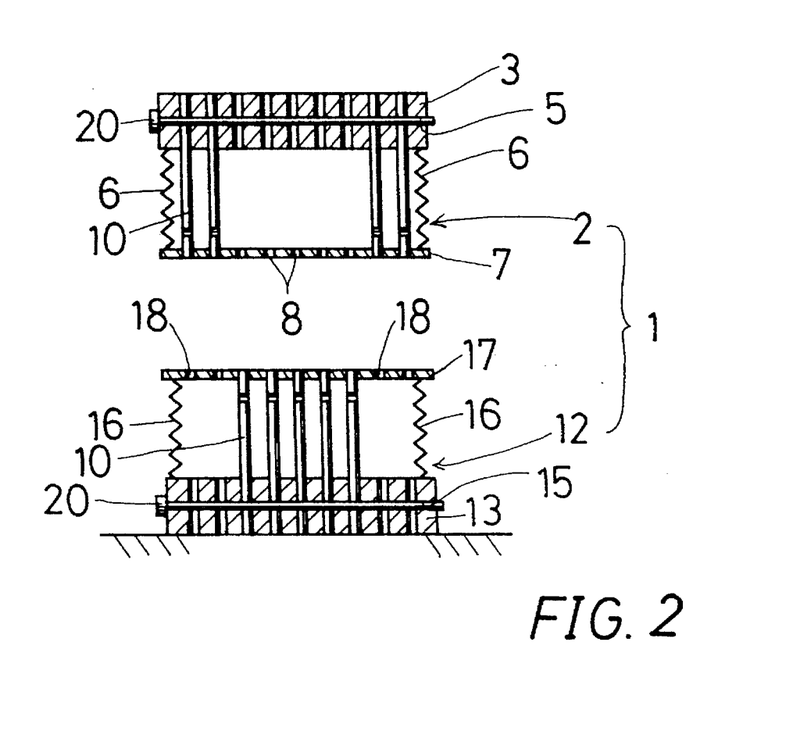
FIG. 2 is a vertical sectional view of the stripping apparatus shown in FIG. 1.

As shown in FIG. 2, a plurality of horizontal stopper holes 5 and 15 are formed on the base plates 3 and 13, respectively. Each of the stopper holes 5 intersects to one of the transverse rows of the support holes 4. Similarly, each of the stopper holes 15 intersects to one of the transverse rows of the support holes 14. An engaging pin 20 is inserted into each one of the stopper holes 5 and 15.

The support plates 7 and 17 are made of rigid thin plates having the same size as the base plates 3 and 13, respectively. A plurality of through-holes 8 and 18 are formed on the support plates 7 and 17, respectively. The through-holes 8 and 18 are arranged in a same manner as the support holes 4 and 14, so that the through-holes 8 and 18 are in alignment with the support holes 4 and 14.

The support plates 7 and 17 are supported by the base plates 3 and 13 by means of coil springs 6 and 16, respectively, and are held in parallel with the base plates 3 and 13 on the lower side and the upper side thereof, respectively. The coil springs 6 and 16 are positioned at four corner portions of the support plates 7 and 17, respectively. The coil springs 6 and 17 may be replaced by vertical guide means such as air cylinders operable for vertical extension and retraction. The coil springs 6 and 16 are disposed between the base plate 3 and the support plate 7 and between the base plate 13 and the support plate 17, respectively. Each of the coil springs 6 has one end fixed to one of the corners of the base plate 3 and has the other end fixed to corresponding one of the corners of the support plate 7. Similarly, each of the coil springs 16 has one end fixed to one of the corners of the base plate 13 and has the other end fixed to corresponding one of the corners of the support plate 17. (To fix the ends of the coil springs 6 and 16, a suitable means can be incorporated, although such fixing means are not shown in the drawings.) When no load is applied to the support plates 7 and 17, each of the coil springs 6 and 16 maintains a predetermined length and the support plates 7 and 17 are positioned at remotest positions from the base plates 3 and 13, respectively. When the load is applied to the support plates 7 and 17 in a direction toward the base plates 3 and 13, respectively, through operation of the press machine to move the base plates 3 and 13 toward each other, the coil springs 6 and 16 are compressed to permit movement of the support plates 7 and 17 toward the base plates 3 and 13, respectively.

Each of the pressing pins 10 has a predetermined length such that its one end is inserted into the support hole 4 of the base plate 3 to reach the outer end of the support hole 4 and that its other end is inserted into the corresponding through-hole 8 of the support plate 7 to reach the outer end of the through-hole 8, resulting in that an end surface of the other end becomes substantially flash with the outer surface of the support plate 7 when no load is applied to the support plate 7 as shown in FIG. 2. This determination of the length of the pressing pin 10 is also applied to the relation to the support hole 14 of the base plate 13 and the through-hole 18 of the support plate 17.

Figure 4:
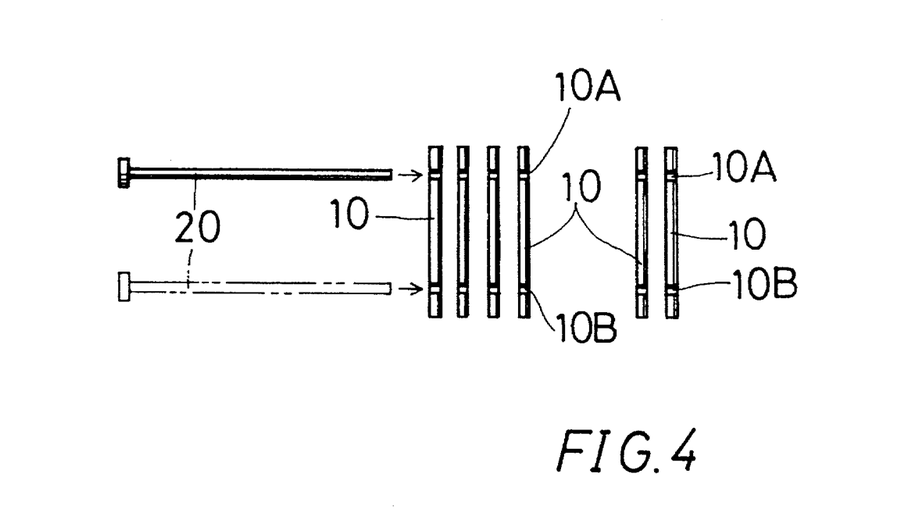
FIG. 4 is a view showing the relationship between engaging recesses of pressing pins and engaging pins.

As shown in FIG. 4, each of the pressing pins 10 includes engaging recesses 10A and 10B which are formed on its upper portion and its lower portion at predetermined heights, respectively. The engaging recesses 10A and 10B are opened in one lateral direction and are formed by grooving the pressing pin 10 in a form of circular arc, respectively.

Figure 3:
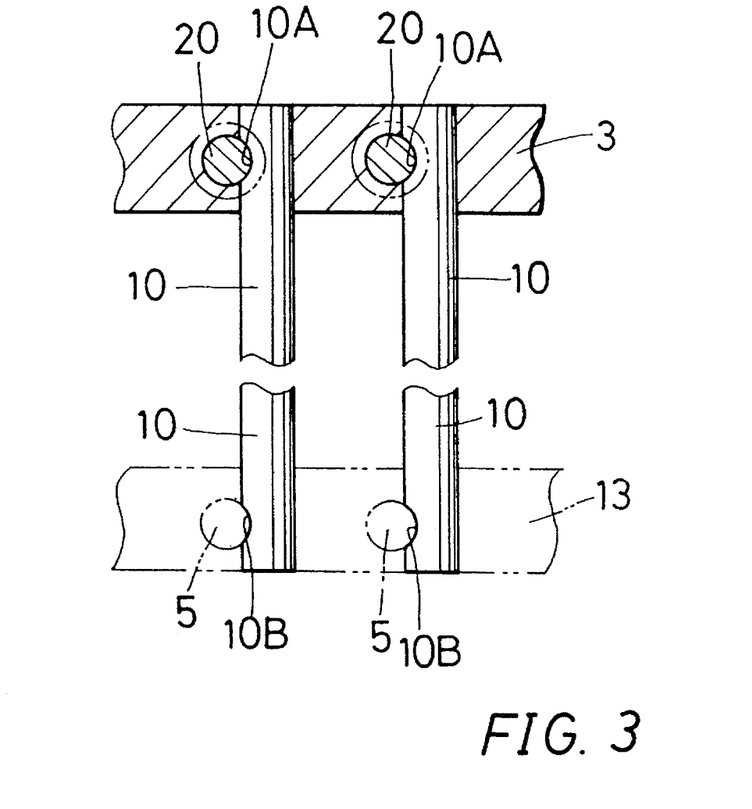
FIG. 3 is an enlarged view of a fixing device of pressing pins.

As shown in FIG. 3, in order to fix the pressing pins 10 to the base plate 3, each pressing pin 10 is inserted into the corresponding support hole 4 of the base plate 3, with the engaging recess 10A oriented in a direction toward the corresponding stopper hole 5, and the pressing pin 10 is positioned such that the engaging recess 10A is at the same height as the corresponding stopper hole 5. Then, the engaging pin 20 is inserted into the stopper hole 5, so that a part of the engaging pin 20 engages the engaging recess 10A, resulting in that the pressing pin 10 is fixed in position relative to the base plate 3. In this operation, the pressing pins 10 inserted into one transverse row of the support holes 4 are simultaneously fixed in position by one of the engaging pins 20.

On the other hand, in order to fix the pressing pins 10 to the base plate 13, each pressing pin 10 is inserted into the support hole 14 of the base plate 13, with the engaging recess 10B oriented in a direction toward the corresponding stopper hole 15, and the pressing pin 10 is positioned such that the engaging recess 10B is positioned at the same height as the corresponding stopper hole 15. Then, the engaging pin 20 is inserted into the stopper hole 15, so that a part of the engaging pin 20 engages the engaging recess 10B, resulting in that the pressing pin 10 is fixed in position relative to the base plate 13. In this operation, the pressing pins 10 inserted into one transverse row of the support holes 14 are simultaneously fixed in position by one of the engaging pins 20.

Figure 5:
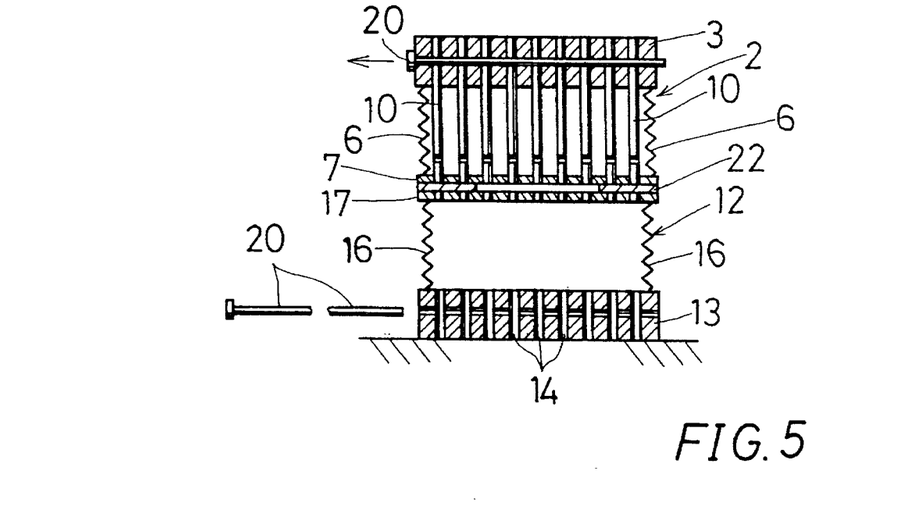
FIG. 5 is a view similar to FIG. 2 but showing the arrangement of the pressing pins before starting of a sorting operation.

The pressing pins 10 are sorted by means of sorting template 22 as shown in FIG. 5 so as to obtain the upper and lower pin boards 2 and 12 as shown in FIG. 1. The following steps are followed:

Firstly, as shown in FIG. 5, the pressing pins 10 are inserted into the support holes 4 of the upper base plate 3 and the engaging pins 20 are inserted into the stopper holes 5 to fix the pressing pins 10 in position, while no engaging pins 20 are inserted into the stopper holes 15 of the lower base plate 13 and no pins 10 are inserted into the support holes 14.

Figure 7:
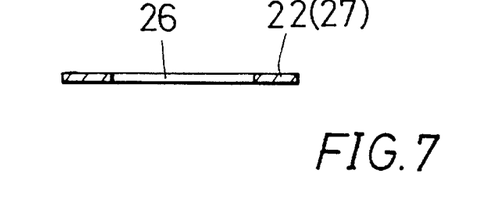
FIG. 7 is a sectional view of a template used for the sorting operation.
Figure 8:
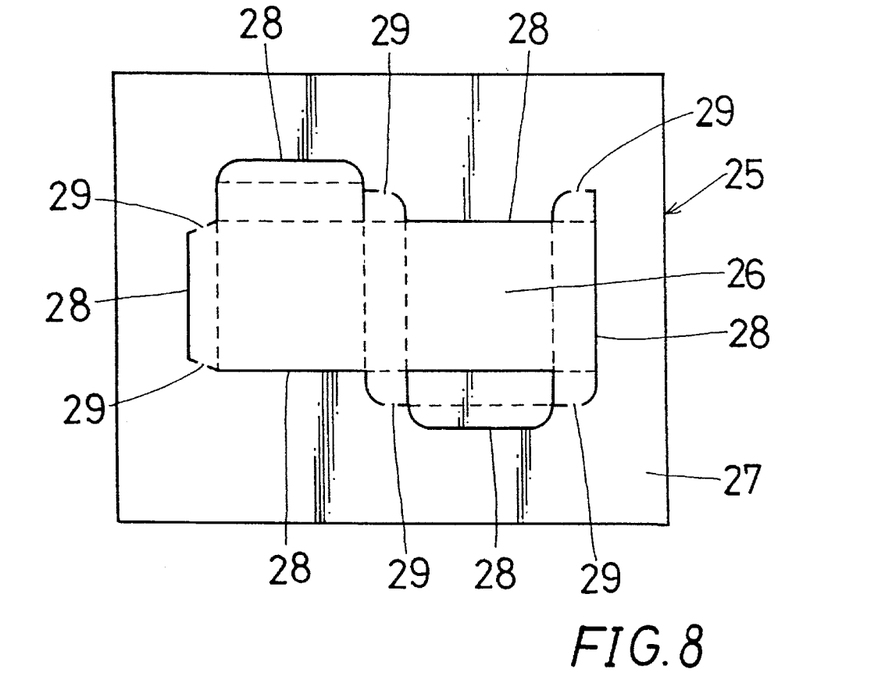
FIG. 8 is a plan view of a paperboard to be separated.
Figure 12:
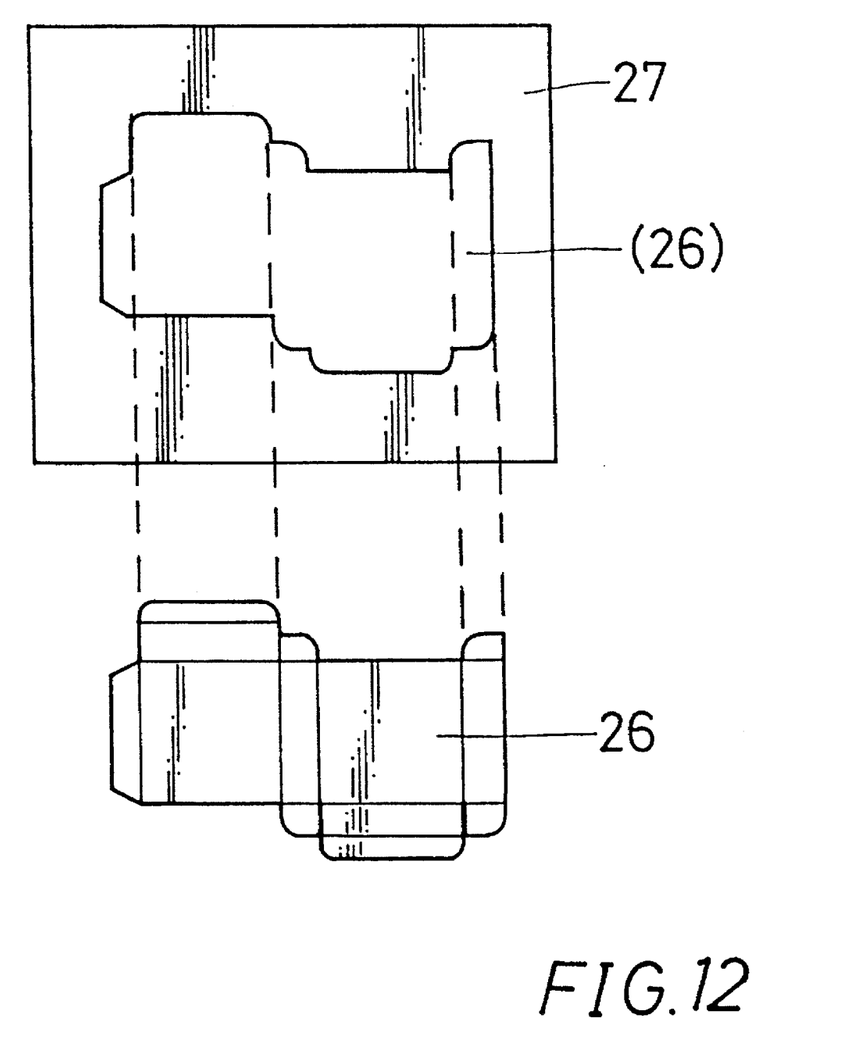
FIG. 12 is a plan view of the waste and the blank of the paperboard after separation.

The upper base plate 3 is then moved downwardly so as to locate the support plate 7 on the support plate 17 of the lower base plate 13 secured to the fixed base having a flat upper surface, with the pressing pins 10 aligned with the through-holes 18 of the support plate 17. At the same time therewith, the sorting template 22 is interposed between the upper support plate 7 and the lower support plate 17 as shown in FIG. 5. As shown in FIG. 7, the sorting template 22 is made of a rigid p late having a configuration conforming to a waste 27 of a paperboard 25 as shown in FIGS. 8 and 12. Thus, the sorting template 22 is formed by punching out the configuration of a blank 26 as shown in FIGS. 8 and 12 from a rigid plate having a rectangular configuration. Alternately, the waste 27 of the paperboard 26 separated from the blank 26 can be used as the sorting template 22.

Figure 6:
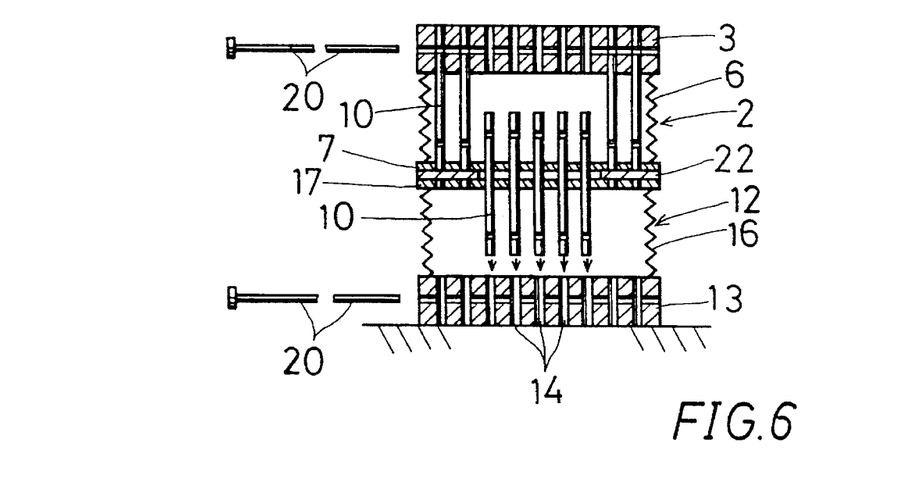
FIG. 6 is a view similar to FIG. 2 but showing the sorting operation of the pressing pins.

Thereafter, the engaging pins 20 in the state of FIG. 5 are removed from the stopper holes 5, so that the pressing pins 10 supported by the upper base plate 3 become free. Then, as shown in FIG. 6, a first group of the support pins 10 which abut on the sorting template 22 are held in position, while a second group of the support pins 10 positioned at the area of the punched-out portion (corresponding to the blank 26) fall into the support holes 14 of the lower base plate 13 through the through-holes 18 of the lower support plate 17 and abut on the flat surface of the fixed base. Thus, the first group of the pressing pins 10 are distributed in the upper base plate 3 in a pattern corresponding to the configuration of the waste while the second group of the pressing pins 10 are distributed in the lower base plate 13 in a pattern corresponding to the configuration of the blank 26. Then, the engaging pins 20 are inserted into the stopper holes 5 and 15, so that the first and second groups of the pressing pins 10 distributed in the patterns as described above are fixed in position to form the pin boards 2 and 12.

The above arrangement of the first and second groups of the pressing pins 20 can be inverted such that the first group of the pressing pins 10 of the upper base plate 3 and the second group of the pressing pins 10 of the lower base plate 13 are distributed in the patterns corresponding to the configurations of the waste 27 and the blank 26, respectively, As shown in FIG. 8, the paperboard 25 for separation by the stripping apparatus 1 is previously formed with cut lines 28 defining the periphery of the blank 26 in the developed form of the box to be obtained. The cut lines 28 are interrupted at appropriate positions by joint portions 29. During the manufacturing process, a predetermined plural number of the paperboards 25 are processed in stacked layers, and therefore, the paperboards 25 having the cut lines 28 are stacked in layers and are supplied to the stripping apparatus 1.

Figure 9:
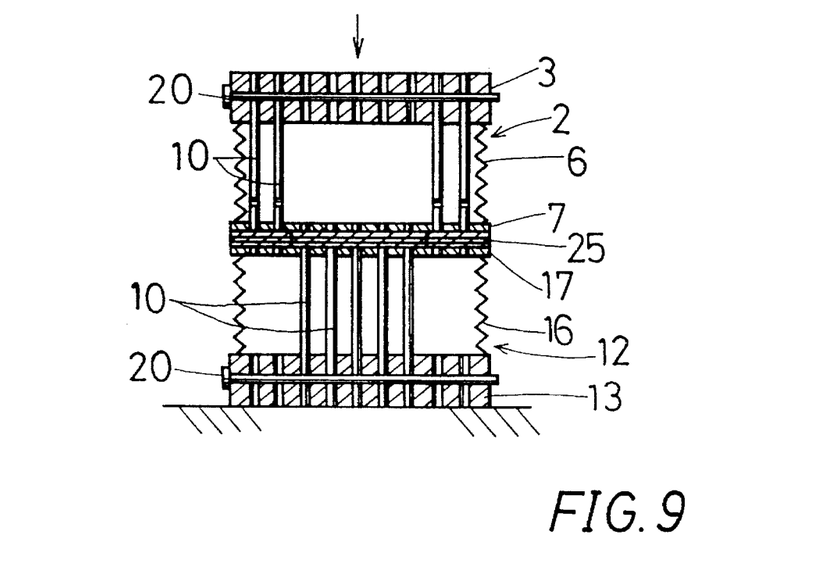
FIG. 9 is a view similar to FIG. 2 but showing the operation for positioning the template on the stripping apparatus.
Figure 10:
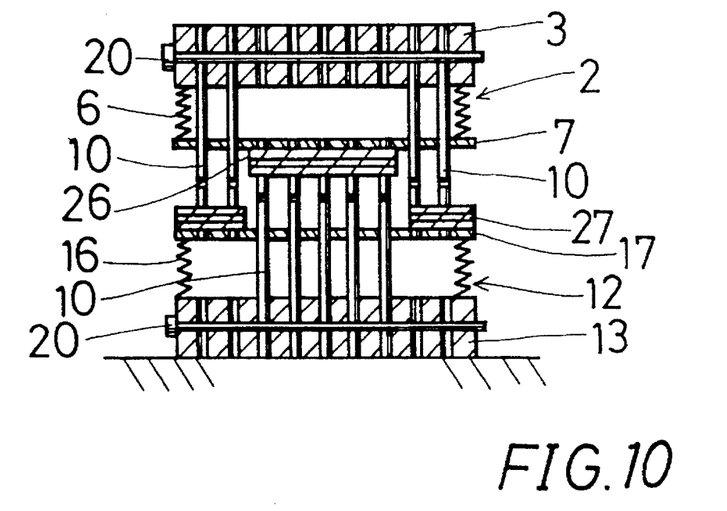
FIG. 10 is a view similar to FIG. 2 but showing the operation for separating blanks and wastes of the paperboards.
Figure 11:
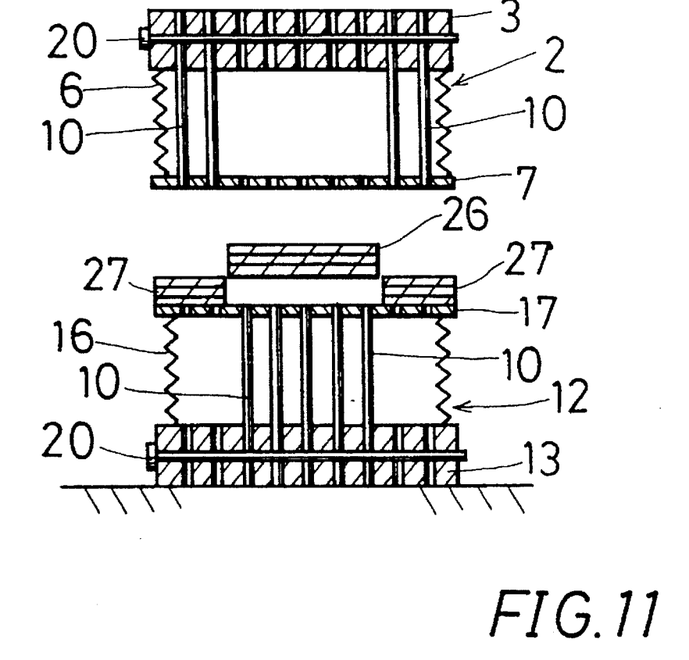
FIG. 11 is a view similar to FIG. 2 but showing the situation where the separation has been finished.

The paperboards 25 thus stacked are inserted between the pin boards 2 and 12 which are positioned as shown in FIGS. 1 and 2. More specifically, the paperboards 25 are placed on the support plate 17 of the lower pin board 12. Then, the upper pin board 2 is moved downwardly by the press machine to have the support plate 7 abutted on the paperboards 25 as shown in FIG. 9. The upper pin board 2 is further moved downwardly to separate the blank 26 of each of the paperboards 25 from the waste 27 through pressing by the pressing pins 10 as shown in FIG. 10. The upper pin board 2 is thereafter moved upwardly to its original position as shown in FIG. 11, so that the blanks 26 separated completely from their corresponding wastes 27 are obtained as shown in FIG. 12. In a practical operation of the machine of this embodiment, although the paperboards 25 to be separated have been stacked in layers as described above, the products parts 26 were reliably separated from the wastes 27 and no damage or deformation was found in the blanks 26.

Although in the above embodiment, the sorting operation of the pressing pins 10 is performed by using the sorting template 22, such a sorting operation can be easily performed by using a stripping apparatus 31 according to a second embodiment of the present invention. The stripping apparatus 31 will now be described with reference to FIGS. 13 to 15. Parts that are the same as those of the first embodiment are given like reference numbers and their description will not be repeated.

Figure 13:
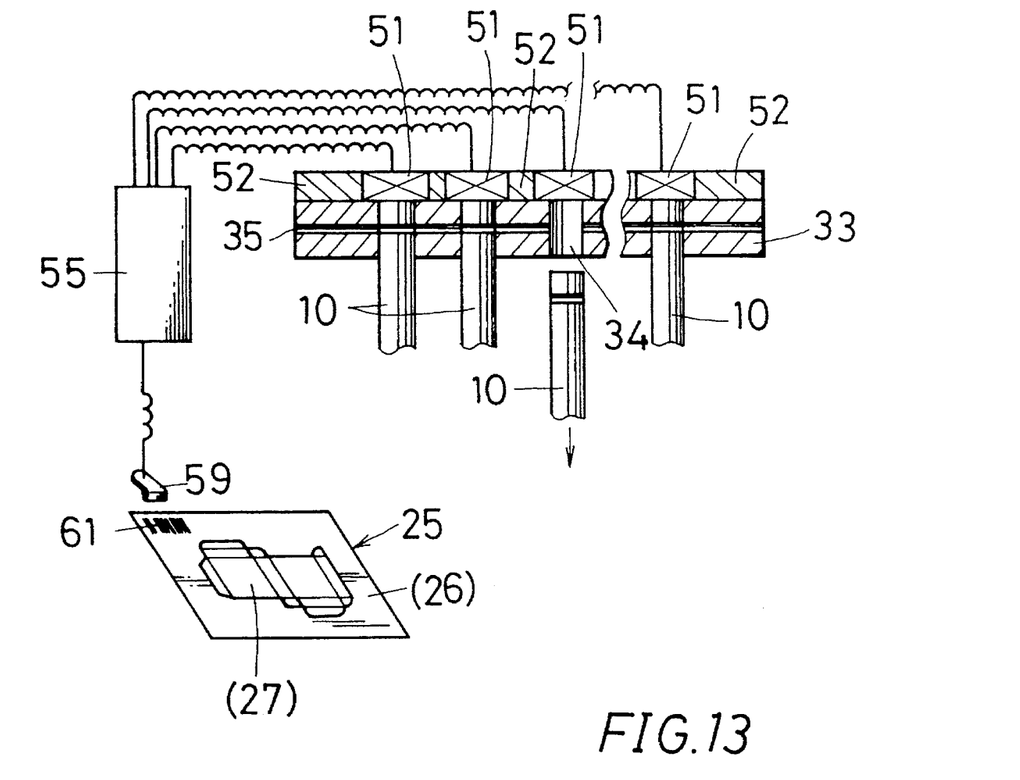
FIG. 13 is an enlarged view of the essential parts of a stripping apparatus according to a second embodiment of the present Invention.
Figure 15:
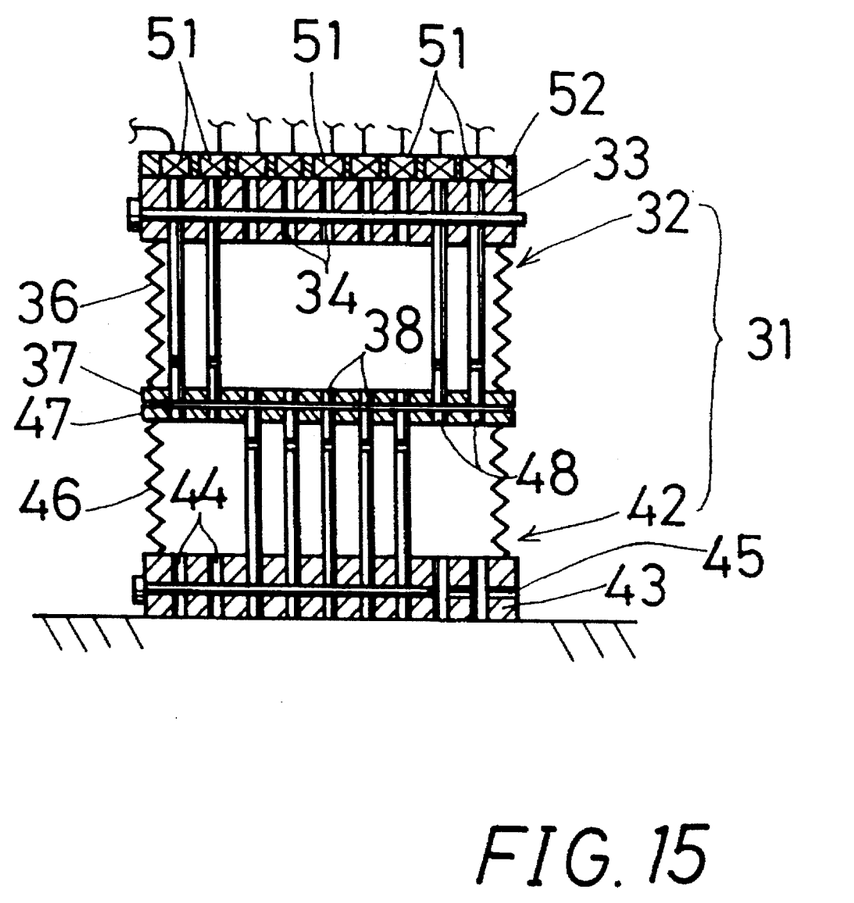
FIG. 15 is a vertical sectional view of the stripping apparatus of the second embodiment.

Similar to the stripping apparatus 1 of the first embodiment, the stripping apparatus 31 of the second embodiment includes a pair of upper and lower pin boards 32 and 42 having base plates 33 and 43, respectively. Support plates 37 and 47 are supported by the base plates 33 and 43 by means of coil springs 36 and 46, respectively. The support plates 37 and 47 include through-holes 38 and 48 which are in alignment with support holes 34 and 44 formed on the base plates 33 and 43, respectively. The pressing pins 20 are insertable into the through-holes 38 and 48 as well as into the support holes 34 and 44. The base plates 33 and 43 further include horizontal stopper holes 35 and 45 for insertion of the engaging pins 20, respectively. Upon insertion of the engaging pins 20 into the stopper holes 35 and 45, the pressing pins 10 inserted into the support holes 34 and 44 are fixed in position relative to the base plates 33 and 43, respectively.

Particularly in this embodiment, the pressing pins 10 are made of ferromagnetic materials such as iron, while the base plates 33 and 43 and the support plate 37 and 47 are made of non-ferromagnetic materials such as aluminum.

Figure 14:
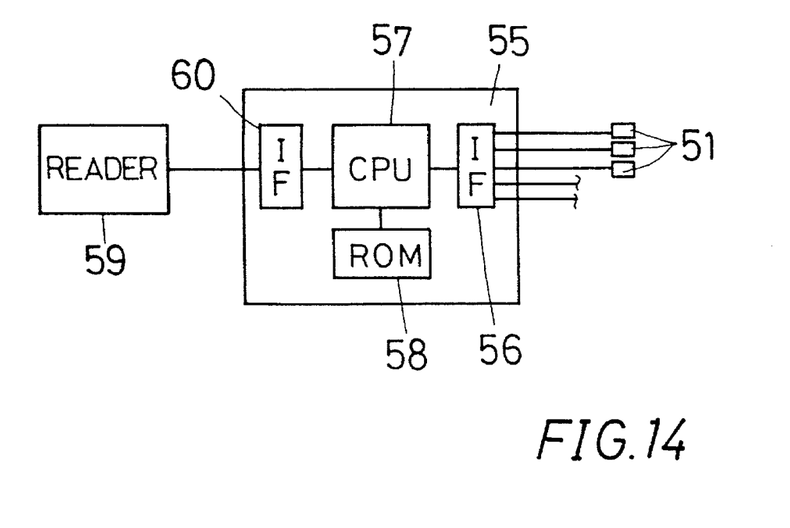
FIG. 14 is a block diagram of a control system for electromagnets shown in FIG, 13.

Electromagnets 51 operable to be independently excited from each other are disposed on the base plate 33 of the upper pin board 32 at positions corresponding to the supporting holes 34, respectively. The electromagnets 51 are mounted on holding member 52 which is fixed to the base plate 33. As shown in FIG. 14, each of the electromagnets 51 is connected to an output interface 56 of a control unit 55. The control unit 55 includes a CPU 57 and a ROM 58 which receive, via an input interface 60, a signal of a bar code 61 read by a reader 59. Based on the signal from the reader 59, the CPU 57 outputs, as a current signal, a predetermined pattern signal stored in the ROM 58 from the output interface 56, so that the electromagnets 51 at predetermined positions are excited. Thus, in this embodiment, the excitation is performed for only the electromagnets 51 disposed in the area corresponding to the pattern of configuration of the waste 27 previously determined in response to the bar code 61. Preferably, the bar code 61 is marked at a corner portion of the paperboard 25 to be separated. As shown in FIG. 13, when the bar code 61 is read by the reader 59 as described above, the pressing pins 10 disposed in the area corresponding to the waste 27 are attracted by the electromagnets 51, while the pressing pins 10 disposed in the area corresponding to the blank 26 are permitted to fall. The sorting operation of the pressing pins 10 can thus easily be performed.

After completion of the sorting operation, the engaging pins 20 are inserted into the stopper holes 35 and 45 of the base plates 33 and 43 to fix the sorted pressing pins 10 in position, so that the stripping apparatus 31 can be constructed to have the pin boards 32 and 34 in which the pressing pins 10 are sorted as shown in FIG. 15.

By using the stripping apparatus 31, the operator can perform the operation for separating the blank 26 and the waste 27 of the paperboard 25 in the same manner as the stripping apparatus 1 of the first embodiment.

In order to cope with change of the blank 26 of the paperboard 25 to another configuration, the engaging pins 20 are removed from both the base plates 33 and 43, and all the pressing pins 10 are inserted into the support holes 34 of the upper base plate 33 and are fixed in position through insertion of the engaging pins 20 into the stopper holes 35 of the base plate 33. The bar code 61 marked on the paperboard 25 is then read by the reader 59 so as to excite the predetermined electromagnets 51. The engaging pins 20 are thereafter removed to permit the non-attracted pressing pins 10 to fall. Thus, the pressing pins 10 can be sorted according to the change of pattern in the same manner as described above.

Although, in the above second embodiment, the electromagnets 51 are selectively excited through reading of the bar code 61 marked on the paperboard 25 by means of the reader 59, such selective excitation of the electromagnets 51 can be performed without using the bar code 61. For example, by means of a key board, the operator may directly input a sign including numerals, etc, determined according to the pattern of the blank 26 to the input interface 60.

Although, in the stripping apparatus 1 and 31 of the above embodiments, the pin boards 2, 12 and 32, 42 include the support plates 7, 17 and 37, 47, respectively, such support plates and their associated coil springs may be omitted if the paperboard to be processed is a rigid one such as a corrugated board having relatively large thickness. Such a rigid paperboard can be maintained in its flat state without aid of the support plates when it is placed directly on the pressing pins 10 of the lower pin board 12 or 42.

Further, although in both sorting devices using the template 22 and the electromagnets 51, the pressing pins 10 are moved toward the lower pin boards 12, 42 by gravity, such movement can be performed by means of pneumatic, hydraulic or other mechanical driving devices.

Additionally, although in the above embodiments, the pressing pins 10 are distributed all the areas corresponding to both the blank 26 and the waste 27, some of the pins 10 can be omitted in some cases where the area of the blank 26 or the area of the waste 27 is relatively large.

While the invention has been described with reference to preferred embodiments, it is to be understood that modifications or variation may be easily made without departing from the spirit of this invention which is defined by the appended claims.

What is claimed is:

1. A stripping apparatus for separating a blank and a waste punched in a paperboard, comprising:
   a pair of first and second base plates disposed in facing relationship to each other in a vertical direction and movable toward and away from each other, said first and second base plates including first support holes and second support holes, respectively, arranged in alignment with each other in the vertical direction and disposed in an area including both a first area part corresponding to the blank of the paperboard and a second area part corresponding to the waste;
   a plurality of pressing pins insertable into said first and second support holes;
   sorting means for sorting said pressing pins to be fixed within said first and second support holes in response to the configurations of the blank and the waste of the paperboard with said pins inserted into said first support holes in both said first and second area parts, said sorting means being operable to permit said pins positioned in one of said first and second area parts to move into corresponding second support holes and being operable to prevent said pins positioned in the other of said first and second area parts from moving into corresponding second support holes;
   fixing means provided on each of said first and second base plates for releasably fixing said pressing pins sorted by said sorting means so that at least a part of each said pressing pin extends outwardly from its corresponding one of said first and second base plates toward the other of said first and second base plates facing thereto;
   whereby the blank and the waste of the paperboard are separated from each other through abutment of corresponding pressing pins fixed to said first and second base plates, respectively, when said first and second base plates are moved toward each other with the paperboard interposed therebetween.

2. The stripping apparatus as defined in claim 1, wherein said pressing pins are made of ferromagnetic materials; said sorting means further comprising electromagnets and control means for controlling excitation of said electromagnets; said electromagnets being mounted on said first base plate at positioned corresponding to said first support holes; said control means being operable to excite one of first and second groups of said electromagnets positioned at the area corresponding to the blank and at the area corresponding to the waste, respectively, so that one of said first and second groups of said electromagnets fixes their corresponding pressing pins inserted into said first support holes while the other of said first and second groups of said electromagnets permits their corresponding pressing pins to be inserted into said second support holes of said second base plate.

3. The stripping apparatus as defined in claim 2 wherein said control means further comprises reading means for reading bar codes previously determined according to various patterns of the blank; and said control means selectively excites said electromagnets based on the information obtained through reading of the bar code by said reading means.

4. The stripping apparatus as defined in claim 1 and further comprising a support plate resiliently mounted on each of said first and second base plates on the side facing to each other; said support plate being spaced from its corresponding base plate by an appropriate distance in a vertical direction; said support plate includes through holes formed therein at positions corresponding to said support holes of said first and second base plates, so that each of the blank and the waste is resiliently held between said support plate and said pressing pins as said first and second base plates are moved toward each other.

5. The stripping apparatus as defined in claim 1, wherein said sorting means further comprises a template having a configuration corresponding to one of the blank and the waste of the paperboard, said template being interposed between said base plates with said pressing pins inserted into said first support holes of said first base plate, so that said template supports end portions of said pressing pins positioned in the area corresponding to one of the blank and the waste and that said template permits said pressing pins positioned in the area corresponding to the other of the blank and the waste to be inserted into said second support holes of said second base plate.

6. A method of stripping paperboard having a blank and a waste punched therein, comprising the steps of:

a) positioning a pair of first and second base plates in facing relationship to each other in a vertical direction, each of said first and second base plates having a plurality of vertical support holes arranged in alignment with each other and positioned in an area including both a first area part corresponding to the blank of the paperboard and a second area part corresponding to the waste;

b) inserting pressing pins into said support holes of said first base plate;

c) moving said pressing pins corresponding to one of said first and second area parts toward said second base plate and inserting into corresponding support holes of said second base;

d) fixing said pressing pins remained within said support holes of said first base plate and inserted into said support holes of said second base plate in such a state that at least a part of each of said pressing pins extends outwardly from its corresponding one of said first and second base plates;

e) positioning the paperboard to be separated in a position between said first and second base plates; and f) moving said first and second base plates toward each other, so that the blank and the waste are separated from each other through abutment of corresponding pressing pins fixed to said first and second base plates, respectively.

* * * * *